UNITED STATES PATENT OFFICE.

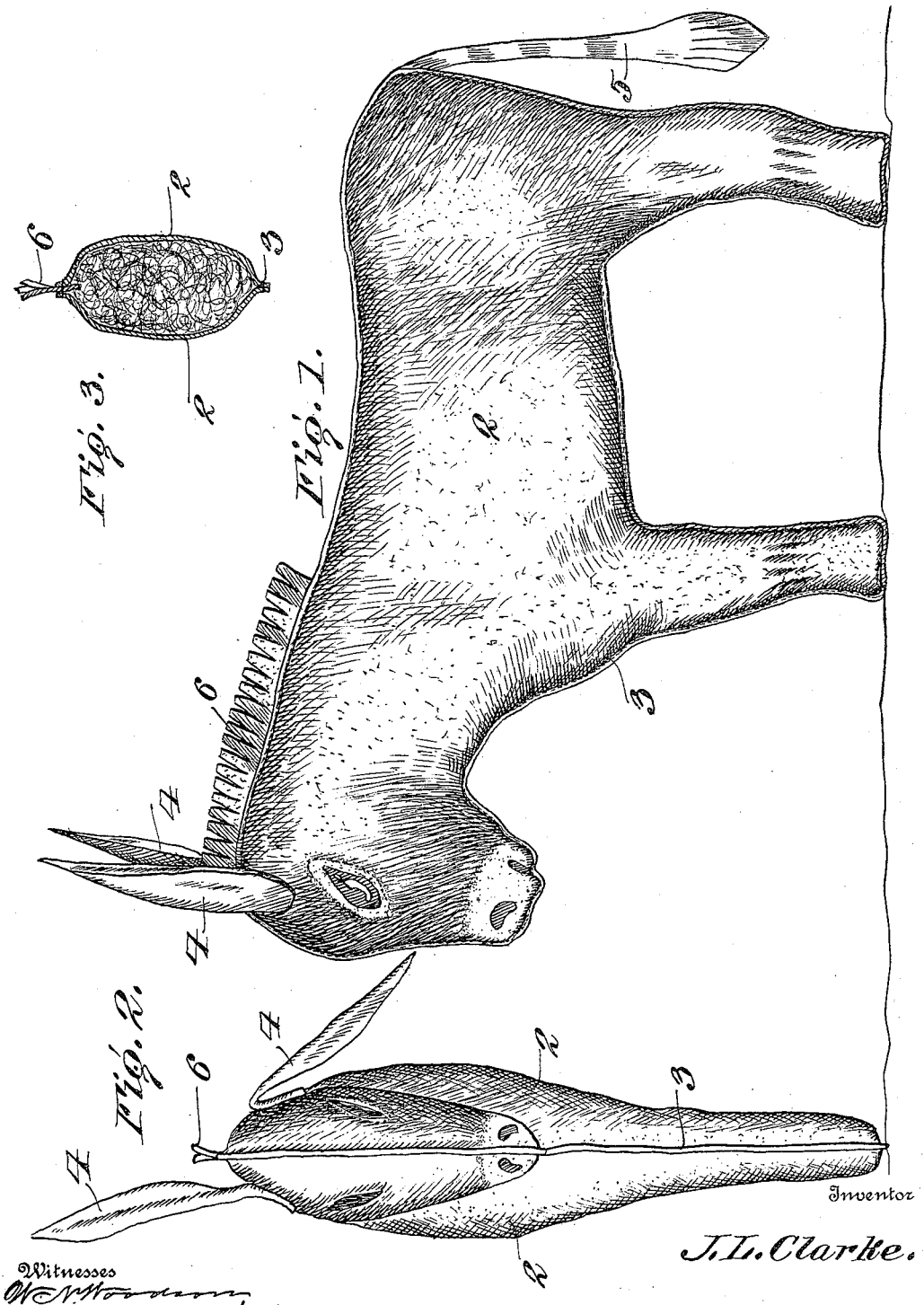

JOHN LEE CLARKE, OF ALBUQUERQUE, TERRITORY OF NEW MEXICO.

TOY.

946,013.      Specification of Letters Patent.      Patented Jan. 11, 1910.

Application filed May 10, 1909. Serial No. 495,009.

*To all whom it may concern:*

Be it known that I, JOHN LEE CLARKE, a citizen of the United States, residing at Albuquerque, in the county of Bernalillo and Territory of New Mexico, have invented certain new and useful Improvements in Toys, of which the following is a specification.

My invention relates to toys, and more particularly to that class of toys which consist of a case formed in the shape of an animal and stuffed with cotton or other like material, the particular object of my invention being to provide a toy of this character which has the form of a "burro" or small donkey, and in which the case is formed of leather, this case being striped by means of pyrography, so as to bear a peculiar likeness to the markings of a burro or donkey, the leather skin having a texture peculiarly resembling the hide of a donkey, and permitting of the use of pyrography as a means of marking the flanks or sides of the animal with the peculiar markings characteristic of donkeys.

The invention also consists in the manner in which the tail and mane of the donkey are formed and attached to the body.

For a full understanding of the invention and the merits thereof, and to acquire a knowledge of the details of construction, reference is to be had to the following description and accompanying drawing, in which:

Figure 1 is a side view; Fig. 2 is a front view; and, Fig. 3 is a section through the neck of the animal.

Corresponding and like parts are referred to in the following description and indicated in all the views of the drawing by the same reference characters.

Referring to the drawing, 1 designates a case forming the body of the animal, consisting of two parts composing the two sides of the burro, these sides being stitched entirely along their contacting margins, as at 3.

4 designates the ears which are formed by folding elliptical pieces of thin leather and stitching or otherwise attaching them at their bases to the head above the eyes. This manner of forming the ears is peculiarly applicable to the imitation of the ears of burros, mules or like animals. The ears of these animals are long, very frequently project sidewise or laterally from the head, and are in more or less continuous movement. By forming the ears as described, and then bending at the base so that the ear extends outward, the weight of the folded material of the ear tends to make it vibrate when the toy is handled, thus giving a very life-like appearance to the toy.

The tail 5 us cut from a flat piece of leather, the upper end of which is placed between the two contiguous sections of the hide or case and is stitched therein. As will be seen in the drawing, the piece of leather forming the tail is enlarged at its lower end and is very narrow at its upper end, the lower end being slitted to suggest the hairs at the end of the tail of the animal. The lower end of the tail being enlarged and the upper end being extremely small, permits the tail to easily vibrate, thus adding to the life-like appearance of the toy.

The mane of the animal is hogged, as is the case with all burros, and is formed by a strip of leather 6 slitted to form an upstanding and relatively stiff mane.

Aside from the manner of construction of the burro, the peculiar characteristic of my invention resides in the use of undressed leather as a covering for the body. This leather not only approximates the natural texture of the hide of the burro very closely, but also permits of the use of pyrography as the means for placing thereon the markings characteristic of the animal. The ordinary animal toys formed of cloth or of hide with the hair on, are marked with ink, paint or dye. These coverings are not only destructible under the use to which they are ordinarily submitted by children, but the markings very easily fade or are worn away. By using pyrography in conjunction with leather, the body is rendered practically indestructible as far as the case is concerned, and the markings do not wear away, but remain in good condition as long as the toy lasts.

As before explained, the case or cover for the body of the animal is formed in two parts which are stitched around their edges. I contemplate by my invention making these sections of the case separate and selling them unstuffed, thus the two sides of the case may be sold in a flat condition, or may be placed on either side of an inner pasteboard support to which they may be detachably fastened. The two sides of the case so supported, may be easily mailed to a distance and the figure be used as a mailing card. Afterward, the two sections may be attached at their edges by stitching, and the figure may be stuffed.

I am aware that postal cards and like articles have been made of burned leather, and that toy animals have been made of cloth stuffed with cotton, etc., and even that these toys have been provided with a covering of real hair, and these I do not claim, these toys not being within the object of my invention, and not being properly indestructible.

My improved toy being covered with leather, is practically indestructible; there is no hair to wear away or become detached by small children; there is no paint or poisonous dye to come off with moisture, and the toy is so strongly made as to last practically as long as the leather of the case lasts.

While my invention is particularly applicable to toys having the form of burros, mules, or donkeys, I wish it understood that I may use the figure of any animal with a hide, in contradistinction to animals such as sheep, bears, etc., covered with hair.

Having thus described the invention, what is claimed as new is:

1. A toy having the appearance of a hided animal, comprising a body case formed of two sections of leather having the general form of the side of the animal and sewed together at their margins, the interior of said case being stuffed, ears formed of folded pieces of leather attached at their bases to the head of the animal, and a mane formed of a strip of slitted leather attached between the margins of the case, the exterior of the case being branded or burned with markings characteristic of the animal which the toy resembles.

2. A toy consisting of a body case formed in two sections of leather and having the general form of a hided animal, said case being stuffed and sewed together at its contiguous edges, the exterior face of the leather being branded or burned to represent the markings characteristic of said animal, ears formed by longitudinally folded pieces of material, a mane formed of a strip of slitted material and attached between the contiguous edges of the case along the neck of the animal, and a tail formed of a flat strip of material, the upper end of the strip being attached between the contiguous edges of the case.

In testimony whereof I affix my signature in presence of two witnesses.

JOHN LEE CLARKE. [L. S.]

Witnesses:
   JOHN B. McMANUS,
   JOHN D. HUGHES.